(12) United States Patent
Ingram (10) Patent No.: US 10,986,858 B2
(45) Date of Patent: Apr. 27, 2021

(54) PLANT TRIMMING MACHINE

(71) Applicant: Keirton Inc., Surrey (CA)

(72) Inventor: Erik Ingram, Abbotsford (CA)

(73) Assignee: Keirton Inc.

( * ) Notice: Subject to any disclaimer, the term of this patent is extended or adjusted under 35 U.S.C. 154(b) by 112 days.

(21) Appl. No.: 16/079,679

(22) PCT Filed: Mar. 23, 2016

(86) PCT No.: PCT/CA2016/050339
§ 371 (c)(1),
(2) Date: Aug. 24, 2018

(87) PCT Pub. No.: WO2017/161435
PCT Pub. Date: Sep. 28, 2017

(65) Prior Publication Data
US 2019/0070741 A1    Mar. 7, 2019

(51) Int. Cl.
*A23N 15/00* (2006.01)
*A01G 3/00* (2006.01)
*B26D 7/06* (2006.01)
*B26D 1/38* (2006.01)
*A01G 3/08* (2006.01)
(Continued)

(52) U.S. Cl.
CPC ............... *A23N 15/00* (2013.01); *A01G 3/00* (2013.01); *A01G 3/002* (2013.01); *A01G 3/08* (2013.01);
(Continued)

(58) Field of Classification Search
CPC ... B26D 1/40; B26D 1/38; B26D 1/36; B26D 7/0691; B26D 7/2614; A01G 3/00;
(Continued)

(56) References Cited

U.S. PATENT DOCUMENTS 8,757,524 B2 * 6/2014 Mosman ................. A01G 3/00
241/30
9,161,566 B2 * 10/2015 Hall ........................ A01G 3/00
(Continued)

FOREIGN PATENT DOCUMENTS

WO     2014183209 A1    11/2014

OTHER PUBLICATIONS

Twister T4 Leaf Trimming Machine Operation Manual, Ver. 1.0, www.twistertrimmer.com, Jul. 2013.
(Continued)

*Primary Examiner* — Adam J Behrens
(74) *Attorney, Agent, or Firm* — KIRTON McCONKIE; Evan R. Witt (57) ABSTRACT

A plant-trimming apparatus comprises two spaced-apart end plates, a rotatable tumbler, a rotatable reel comprising a reel shaft and reel blades, two bearing blocks, each detachably connected to a respective end plate and rotatably supporting a respective end of the reel, a motor arranged to drive the reel and the tumbler, a bed bar assembly comprising a bed bar and a bed knife, the bed knife being in operative engagement with the reel blade for cutting of plant material from the tumbler, and a manually-operated locking mechanism operable to secure the bearing blocks and the bed bar assembly to the end plates. The apparatus can be easily disassembled for cleaning and re-assembled, without using tools.

19 Claims, 11 Drawing Sheets

(51) Int. Cl.
*B26D 1/40* (2006.01)
*B26D 7/26* (2006.01)
*A01G 17/02* (2006.01)

(52) U.S. Cl.
CPC ............... *B26D 1/38* (2013.01); *B26D 1/40* (2013.01); *B26D 7/0691* (2013.01); *B26D 7/2614* (2013.01); *A01G 17/026* (2013.01)

(58) Field of Classification Search
CPC .... A01G 3/002; A01G 3/0435; A01G 17/026; A01G 2003/005; A23N 15/00–12
See application file for complete search history.

(56) References Cited

U.S. PATENT DOCUMENTS

| | | | | |
|---|---|---|---|---|
| 9,636,838 B2* | 5/2017 | Evans | ................. | A01G 3/002 |
| 9,682,488 B2* | 6/2017 | Beyerlein | ............... | B26D 1/40 |
| 2012/0279193 A1* | 11/2012 | Mosman | ................. | A01G 3/00 |
| | | | | 56/233 |
| 2014/0087794 A1* | 3/2014 | Hall | ................. | A23N 15/06 |
| | | | | 460/123 |
| 2014/0196587 A1* | 7/2014 | Beyerlein | ............... | B26D 1/40 |
| | | | | 83/312 |
| 2015/0285427 A1* | 10/2015 | Evans | ................. | A01G 3/08 |
| | | | | 83/859 |
| 2015/0290827 A1* | 10/2015 | Evans | ................. | A01G 3/002 |
| | | | | 83/698.11 |
| 2017/0164557 A1* | 6/2017 | Harold | ................. | A01D 46/02 |

OTHER PUBLICATIONS

International Search Report for the corresponding PCT application, PCT/CA2016/050339, dated Nov. 18, 2016.

* cited by examiner

Figure 11 ns to plant trimming
PLANT TRIMMING MACHINE

TECHNICAL FIELD

The present invention pertains to plant trimming machines, and in particular, to plant trimming machines that can be easily disassembled and re-assembled.

BACKGROUND

It is known in the plant-trimming art to employ a plant trimming apparatus which comprises a tumbler, a cutting mechanism which includes a rotatable reel having helix-shaped blades, and a bed bar with a bed knife attached to the bed bar. In operation, plant material such as aromatic herbs that requires trimming is fed into the tumbler and the cutting mechanism cuts the plant material in a scissor-like shearing action as the helical blades of the rotatable reel pass over the stationary bed knife. Examples of such machines are disclosed in WO 2014/183209, WO 2014/190425 and WO 2015/003256.

Some conventional plant trimming machines incorporate a fixed cutting mechanism. Such machines make cleaning and maintenance of the components of the cutting mechanism difficult. In other conventional plant trimming machines, components of the cutting mechanism may be removed by using appropriate tools, but the disassembly and re-assembly of the machines can be time-consuming and require highly-skilled labor.

There is thus a need for a plant trimming machine that can be easily disassembled for cleaning or maintenance and re-assembled.

SUMMARY OF THE INVENTION

One aspect of the invention provides a plant trimming apparatus comprising: two spaced-apart end plates; a rotatable tumbler comprising a perforated cylindrical wall; a rotatable reel comprising a reel shaft and a reel blade; two bearing blocks, each detachably connected to a respective end plate, rotatably supporting a respective end of the reel; a motor arranged to drive the reel and the tumbler; a bed bar assembly comprising a bed bar and a bed knife, the bed knife being in operative engagement with the reel blade for cutting of plant material from the tumbler; and a locking mechanism operable to secure the bearing blocks and the bed bar assembly to the end plates.

Another aspect of the invention provides a plant-trimming apparatus comprising: two spaced-apart support members; a rotatable, perforated tumbler; a rotatable cutting member; two bearing blocks, each detachably connected to a respective support member, rotatably supporting a respective end of the rotatable cutting member; means for rotating the rotatable cutting member and the tumbler; a non-rotatable cutting member in operative engagement with the rotatable cutting member for cutting of plant material from the tumbler; and means for detachably affixing the bearing blocks and the non-rotatable cutting member to the support members.

Another aspect of the invention provides a method for disassembling a plant trimming apparatus comprising the steps of removing the rotatable tumbler, pivoting the cam levers to an unlocking position, removing the bed bar assembly, and removing the bearing blocks with the reel assembly from the end plates.

Further aspects of the invention and features of specific embodiments of the invention are described below.

BRIEF DESCRIPTION OF THE DRAWINGS

In drawings which illustrate non-limiting embodiments of the invention.

DETAILED DESCRIPTION OF THE INVENTION

Figure 1:
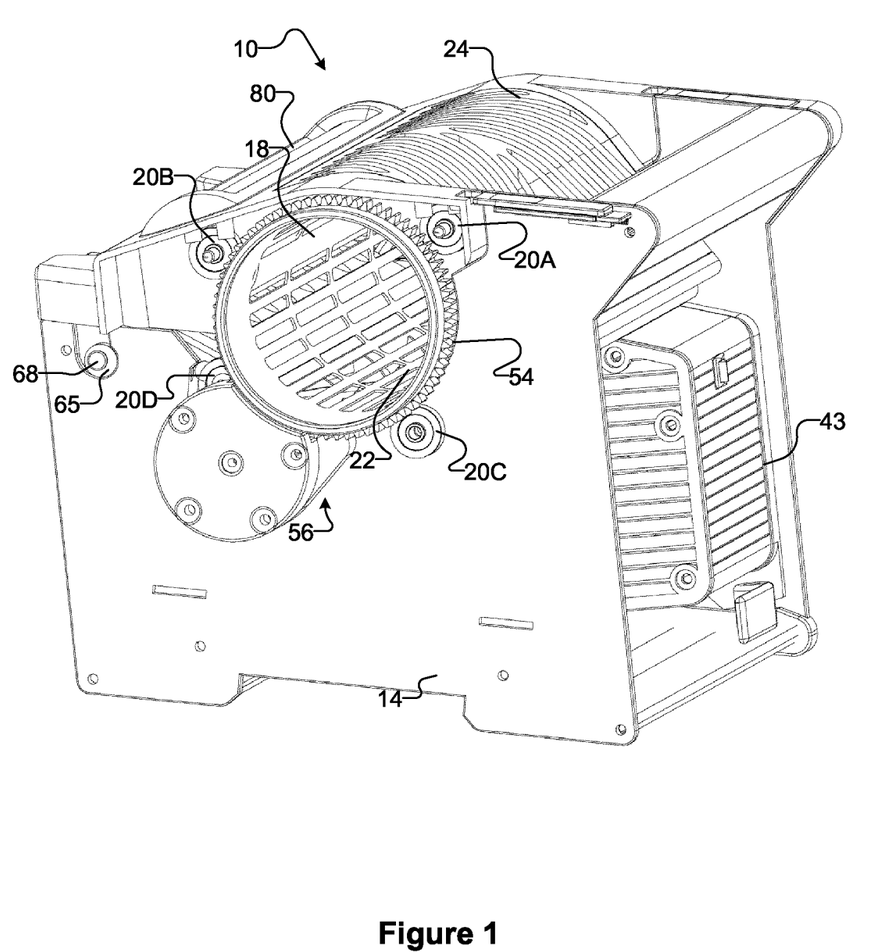
FIG. 1 is a perspective view of a plant trimming machine according to one embodiment of the invention.
Figure 2:
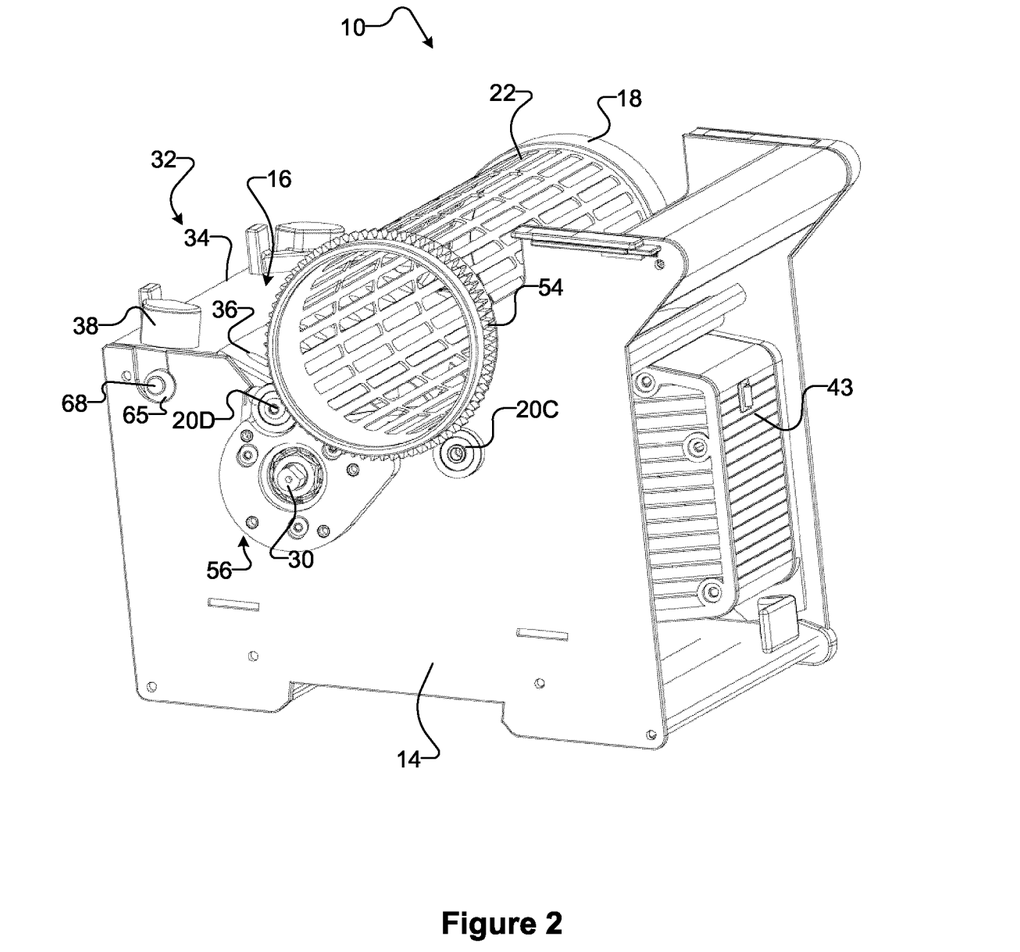
FIG. 2 is a perspective view of the embodiment of FIG. 1 showing the plant trimming machine without its removable lid.

Referring first to FIGS. 1 to 4, the plant trimming machine 10 has a front plate 12, two end plates 14 mounted on the left and right side of the machine 10, a cutting mechanism 16 removably mounted on the end plates 14, and a removable, rotatable tumbler 18, having a plurality of holes 22, adjacent to the cutting mechanism 16. The plant trimming machine 10 has a removable lid 24 to cover the tumbler 18 and the cutting mechanism 16. As illustrated in FIG. 1, the removable lid 24 surrounds approximately one-third to one-half of the outer circumference of the tumbler 18.

The cutting mechanism 16 (best seen in FIG. 4) includes a reel 26, a bed bar 34 and a bed knife 36. Optionally, in some embodiments the bed bar assembly may be replaced by a unitary bed knife, with no separate bed bar component. The bed knife 36 is bolted to the bed bar 34 to form a bed bar assembly 32. The reel 26 comprises several helical blades 28 that are mounted to a rotatable shaft 30. The reel 26 is positioned adjacent to the bed bar assembly 32 and the tumbler 18.

Tumbler support wheels 20A, 20B, 20C and 20D positioned at each end of the tumbler 18 support the tumbler for rotation about its longitudinal axis. The tumbler support wheels 20A, 20B, 20C and 20D are positioned so as to surround the centrally-positioned tumbler 18. In the illustrated embodiment, the plant trimming machine 10 has four tumbler support wheels 20A, 20B, 20C, 20D at each end. As seen in FIG. 1, tumbler wheels 20A, 20B are affixed to the removable lid 24, tumbler wheel 20C is affixed to the end plate 14, and tumbler wheel 20D is mounted on the bearing block 56.

The position of the bed bar assembly 32 relative to the reel 26 is adjustable by means of left and right side adjustment levers 38. By adjusting the position of the bed bar assembly 32, the distance between the tip of the bed knife 36 and the reel blades 28 is adjusted to optimize the shearing action. The adjustment levers 38 are each connected to a downwardly extending threaded bolt (not shown). The bottom end of the bolt is threadedly attached to a fixed pin 68 which extends within a chamber 69 in the bed bar across its length (see FIG. 4). Clockwise or counterclockwise movement of the levers 38 turns the bolts to raise or lower the bed bar assembly 32, relative to the fixed pin 68, by means of the engagement of the threads of the bolt with the fixed pin 68.

Figure 3:
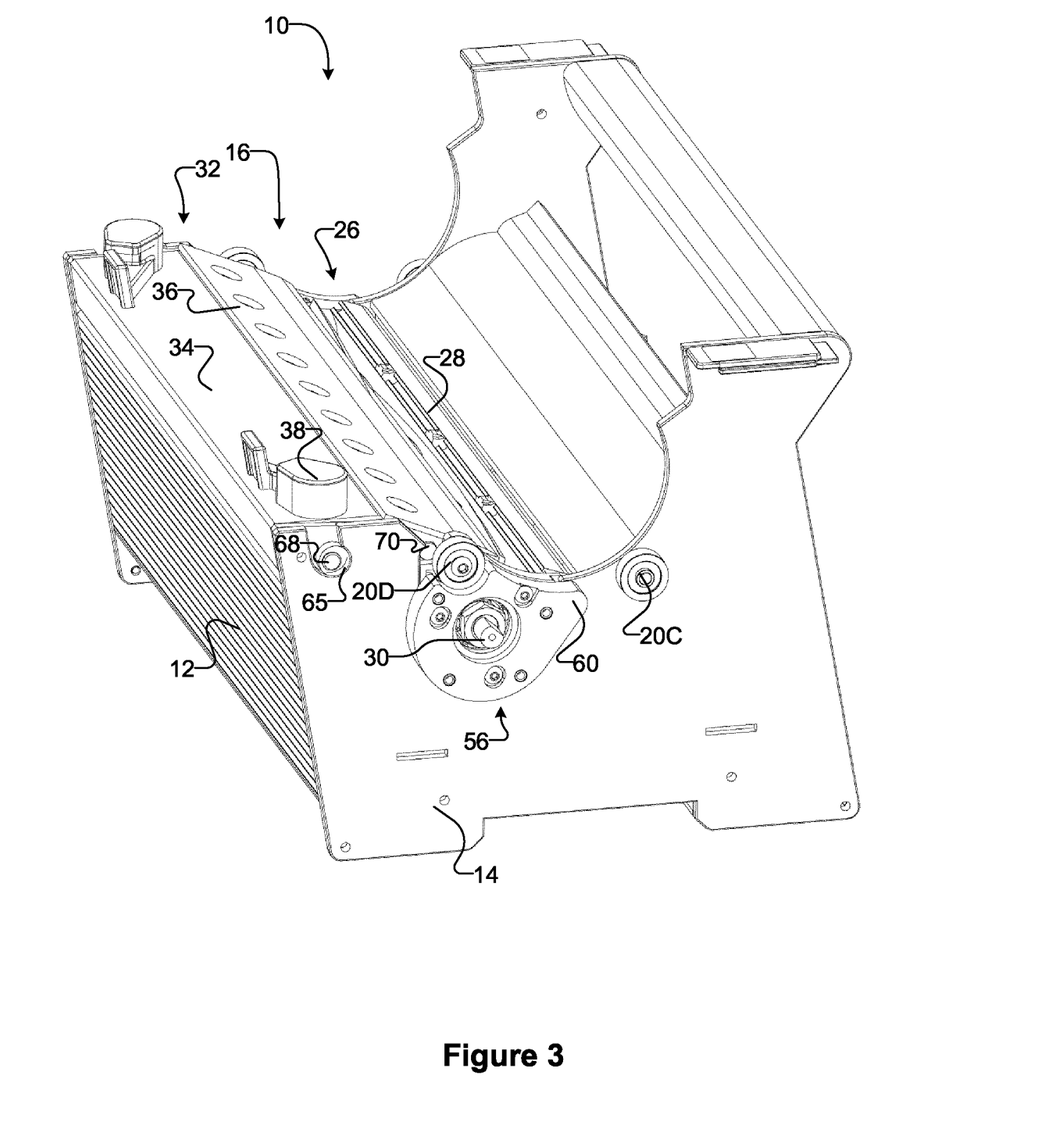
FIG. 3 is a perspective side view of the embodiment of FIG. 1 showing the plant trimming machine without its lid and tumbler.
Figure 4:
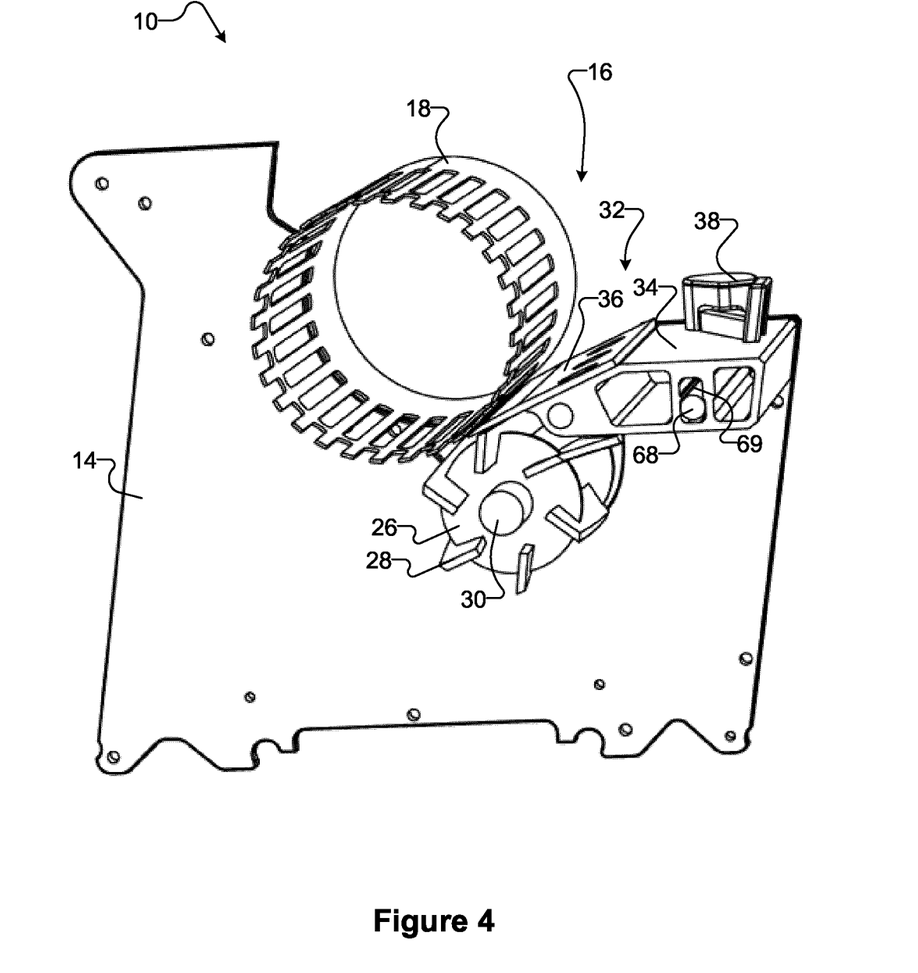
FIG. 4 is a sectional elevation view of the embodiment of FIG. 1 showing details of the cutting mechanism of the plant trimming machine.
Figure 5:
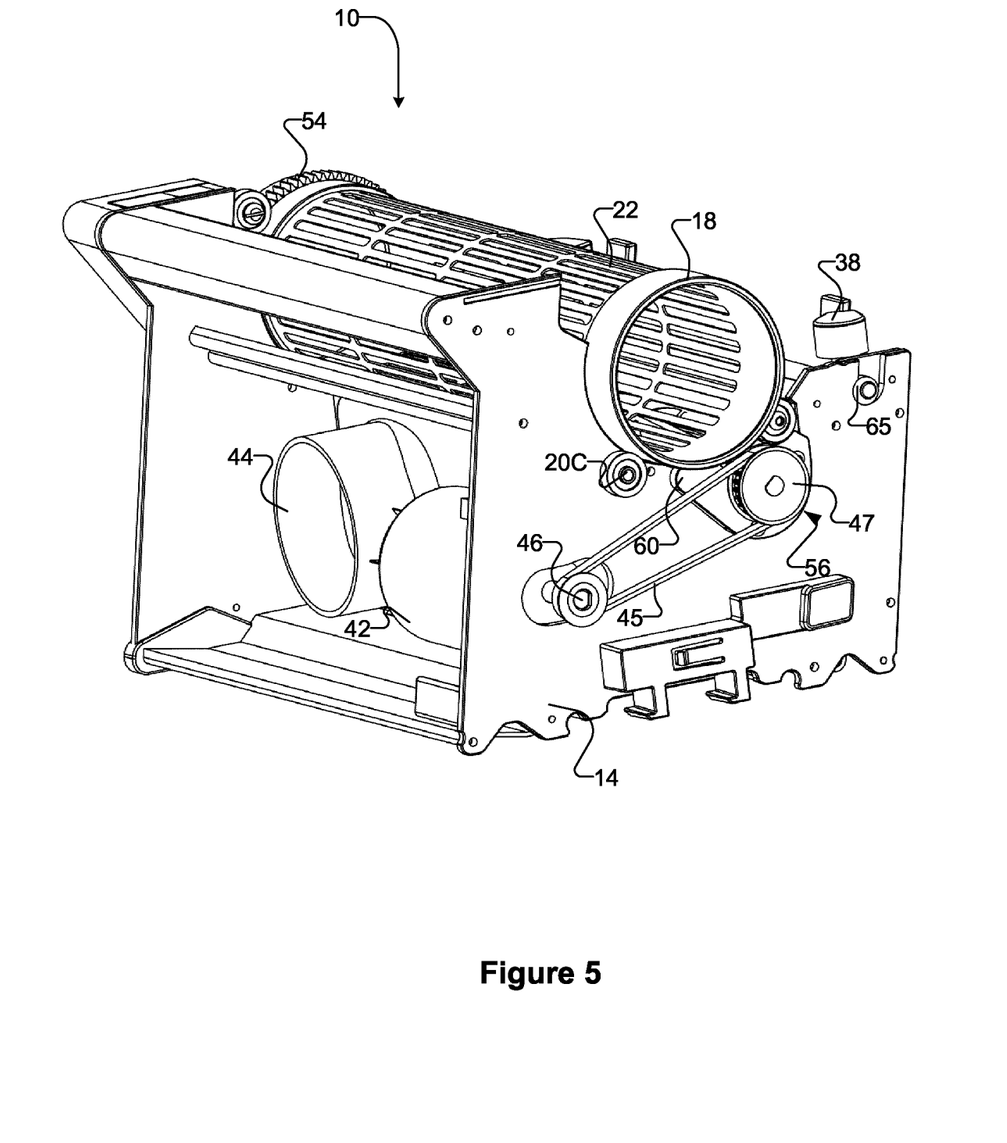
FIG. 5 is a perspective back view of the embodiment of FIG. 1 showing the plant trimming machine without its lid.

Referring to FIGS. 3 and 5, the plant trimming machine 10 has a motor 42 mounted on an inside wall of one end plate 14, and a shroud 44 mounted under the reel 26. The shroud 44 is configured to receive the trimmed-off parts of the plants. The motor 42 is in a motor housing 43 (seen in FIGS. 1 and 2). The motor 42 is operable to drive the rotational movement of the reel 26 which in turn rotates the tumbler 18. A drive shaft 46 connects the motor 42 to a reel gear 47 by a belt 45. The reel gear 47 is affixed to the end of the reel 26 at the motor end of the apparatus 10. The rotary motion of the reel gear 47 and the reel 26 transmits a rotary motion to a planet gear assembly 48 at the opposite end of the reel 26 (shown in FIG. 6), as explained below.

In operation, plant material that requires trimming is fed into the rotating tumbler 18. As the plant material is tumbled, the parts of the plant material that project out through the holes 22 in the tumbler 18 are cut by the cutting mechanism 16 in a scissor-like shearing action as the helical blades 28 of the rotating reel 26 contact the stationary bed knife 36. The cut material is conveyed through the shroud 44 to a receiving receptacle (not shown).

Figure 6:
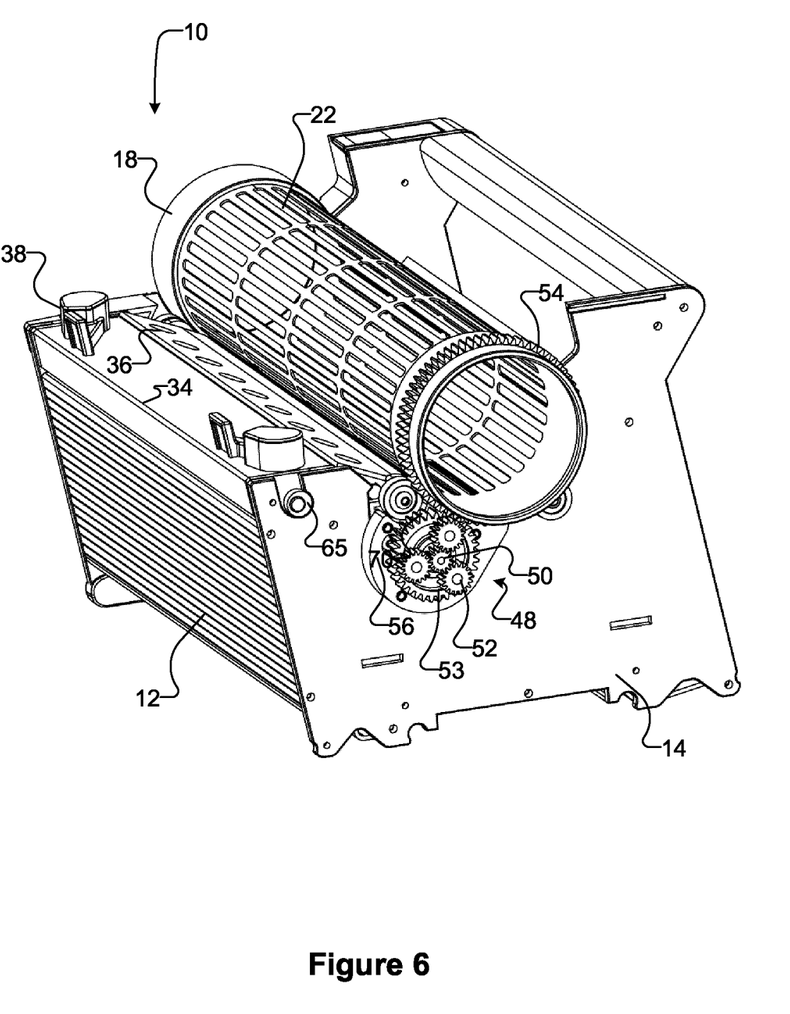
FIG. 6 is a perspective view of the embodiment of FIG. 1 showing details of the inside of a planet gear assembly of the plant trimming machine.

The planet gear assembly 48, shown in FIG. 6, includes a centrally-positioned sun gear 50, a plurality of planet gears 52 which revolve about the sun gear 50, and a planet carrier 53 attached to the planet gears 52 and the sun gear 50. In the illustrated embodiment, the planet gear assembly 48 has three planet gears 52. Other suitable numbers of planet gears 52 may be used.

The sun gear 50 and planet gears 52 comprise outward-facing teeth, and the teeth of the planet gears 52 mesh with the teeth of the sun gear 50. The sun gear 50 is affixed to the reel shaft 30 of the reel 26. In operation, the motor drive shaft 46 drives the reel gear 47 at the motor side of the reel 26 (shown in FIG. 5), which in turn transmits rotary motion to the sun gear 50 at the opposite side of the reel 26 (shown in FIG. 6). The rotary motion of the sun gear 50 in turn drives the rotation of the planet gears 52, which in turn drives the rotation of the planet carrier 53. Rotation of the planet carrier 53 then drives the circumferential tumbler drive gear 54, thereby transmitting torque to rotate the tumbler 18.

The number of teeth on the sun gear 50 and the planet gears 52 (or the gear ratio in the planet gear assembly 48) may vary depending on the desired relative speed of rotation between the reel 26 and the tumbler 18. By changing the relative speed of rotation between the reel 26 and the tumbler 18, the number of shearing actions per rotation of the tumbler 18 can be changed. In some embodiments, the gear ratio is selected so that approximately one to four helical blades 28 of the reel 26 intersect each hole 22 of the tumbler 18 (i.e., that approximately one to four shearing actions occur at each hole 22 of the tumbler 18) during each rotation of the tumbler 18.

Figure 7:
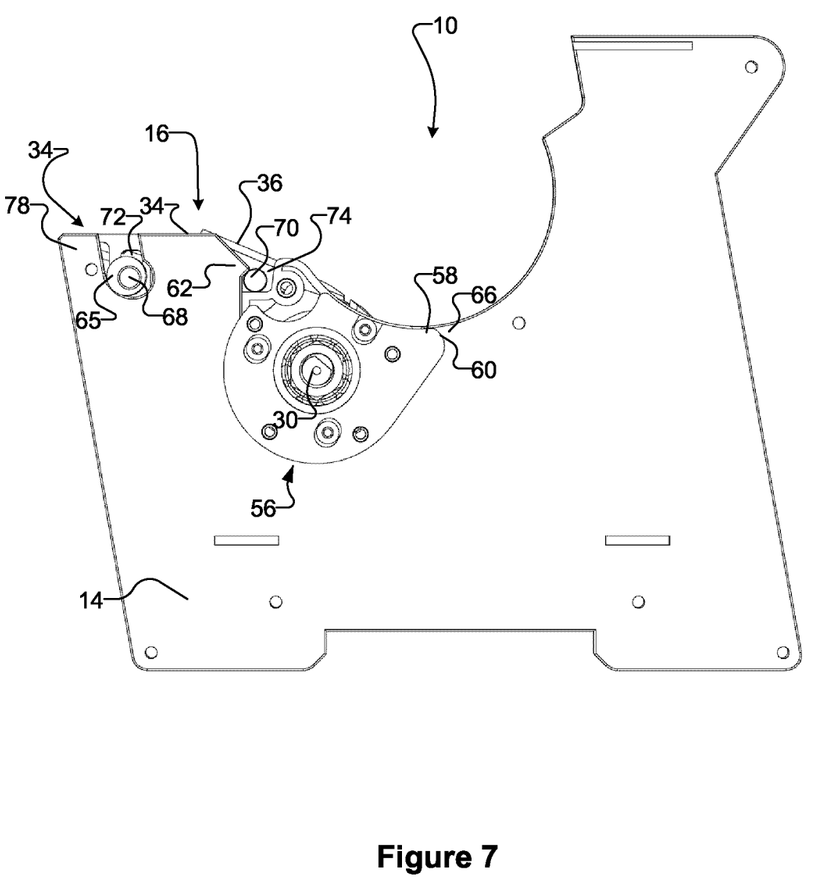
FIG. 7 is a schematic side view of the embodiment of FIG. 1 showing the plant trimming machine without its lid and tumbler.
Figure 8:
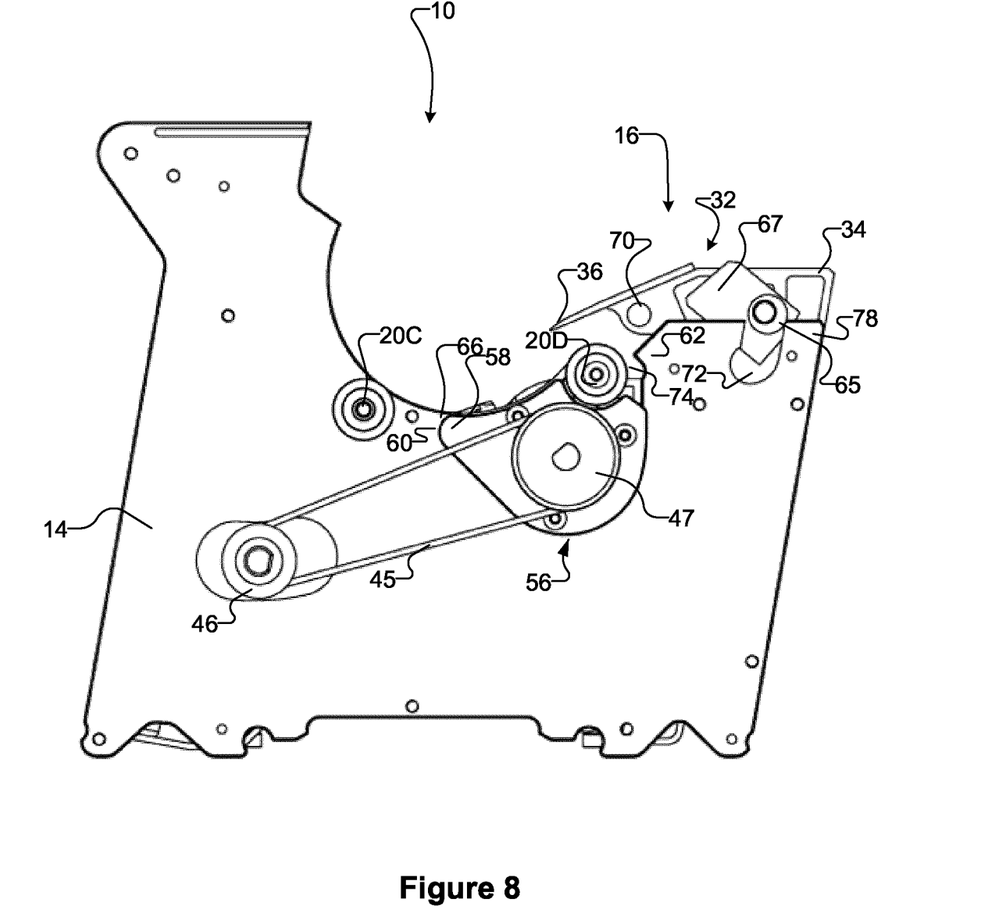
FIG. 8 is a schematic side view of the embodiment of FIG. 1 showing the plant trimming machine with the bed bar assembly pivoted partly out of engagement with an end plate of the machine.

FIGS. 7 and 8 are schematic side views of the plant trimming machine 10 without the tumbler 18 and the removable lid 24 and depict the connections between the components of the cutting mechanism 16 that are removably mounted to the end plates 14. Both end plates 14 of the machine are substantially the same, and FIGS. 7 and 8 are views of each of the two end plates 14, respectively. The rotatable shaft 30 of the reel 26 is fitted in the sun gear 50 and received in the bearing block 56. The planet gear assembly 48 is secured to the bearing block 56 (shown in FIG. 6). As seen in FIG. 7, the bearing block 56 has a corner 58 which provides a pivot point 60 which fits under a shoulder 66 of the end plate.

The bearing block 56, including the reel 26 and the planet gear assembly 48, and the bed bar assembly 32, which includes the bed bar 34 and the bed knife 36, are removably locked to the end plate 14 by means of two cam lever mechanisms, one adjacent to each of the two end plates 14. The cam lever mechanism comprises a manually-operable lever 67 to rotate an eccentric cam 65 and thus release a respective fixed pin member 70 of the bed bar assembly 32 from the end plate 14. The cam lever mechanism is securely affixed to the bed bar assembly 32. The eccentric cam 65 is removably mounted in a cam-receiving aperture 72 of the end plate 14, and the pin member 70 is removably mounted in a notch 74 in the end plate 14. The cam-receiving aperture 72 is positioned adjacent to a top edge 78 of the end plate 14. The notch 74 is positioned between a shoulder 62 of the end plate 14 and a side of the bearing block 56 such that the pin member 70 is removably engageable with both the end plate 14 and the bearing block 56.

Figure 9:
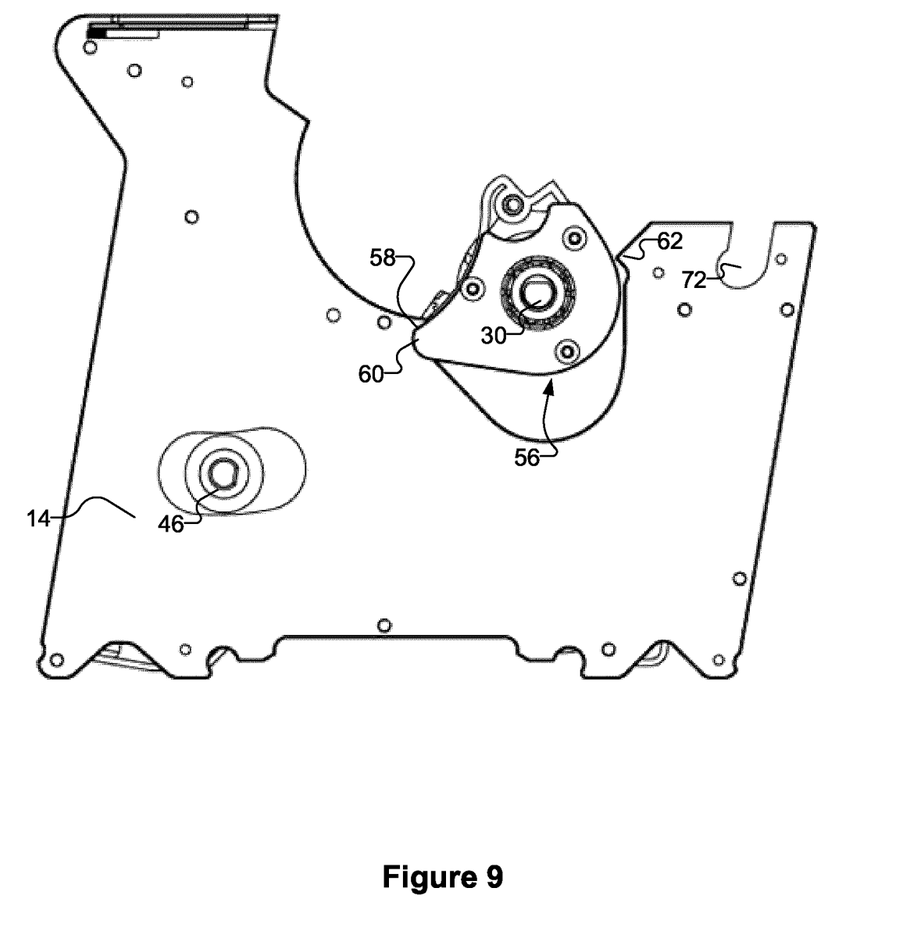
FIG. 9 is a schematic side view of the embodiment of FIG. 1 showing the plant trimming machine with a bearing block pivoted partly out of engagement with an end plate of the machine.

The cam-operating levers 67 are pivotable upwards into an unlocking position shown in FIG. 8, and downwards into the lock position shown in FIG. 7. Referring to FIG. 7, when the cam-operating lever 67 is in the locking position, it is located between an inner side of the end plate 14 and the bed bar assembly 32 (and is thus not visible in FIG. 7), and the bed bar assembly 32 and the bearing block 56 are securely attached to the end plate 14. As illustrated in FIG. 8, when the cam-operating lever 67 is pulled upwards into the unlocking position, the bed bar assembly 32 moves laterally (to the left in the view of FIG. 8 or to the right in the view of FIG. 7), freeing the pin member 70 from the shoulder 62 of the end plate 14, such that the pin member 70 can be removed from the notch 74. As a result of the pin member 70 being released from the notch 74, the eccentric cam 65 can be lifted out of the cam-receiving aperture 72 of the end plate 14, and the bed bar assembly 32 removed from the machine 10 (shown in FIG. 8). The bearing block 56, including the reel 26, the reel gear 47 and the planet gear assembly 48, can then be moved pivotally and removed from the end plate 14 by an upward rotation of the bearing block 56 about the pivot point 60 (shown in FIG. 9). As the bearing blocks 56 and the reel 26 are securely attached to each other, they are removed from the machine 10 as a single unit. Consequently, when the cam-operating levers 67 at both ends of the machine 10 are in their unlocking positions, the cutting mechanism 16 can be removed from the machine 10.

In some embodiments, the plant trimming machine 10 includes a roller brush 80 to clean the tumbler 18. The roller brush 80 is secured to the removable lid 24 (shown in FIG.

1). In the illustrated embodiment, the roller brush 80 is positioned parallel to the tumbler 18, between the tumbler 18 and the bed knife 36, such that it rubs against the outside of the tumbler 18 as the tumbler rotates.

Figure 10:
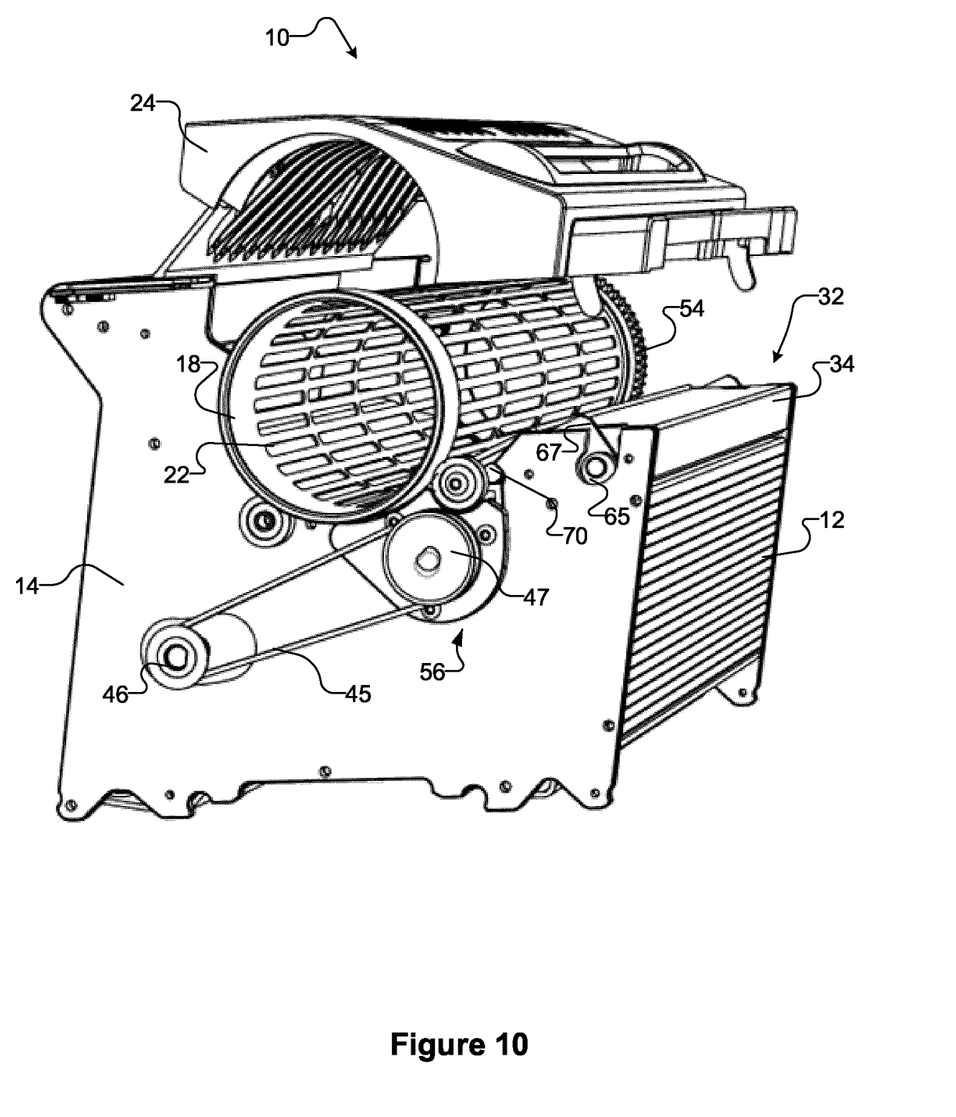
FIG. 10 is a perspective view of the embodiment of FIG. 1 showing the plant trimming machine with its lid pivoted out of engagement with its tumbler.
Figure 11:
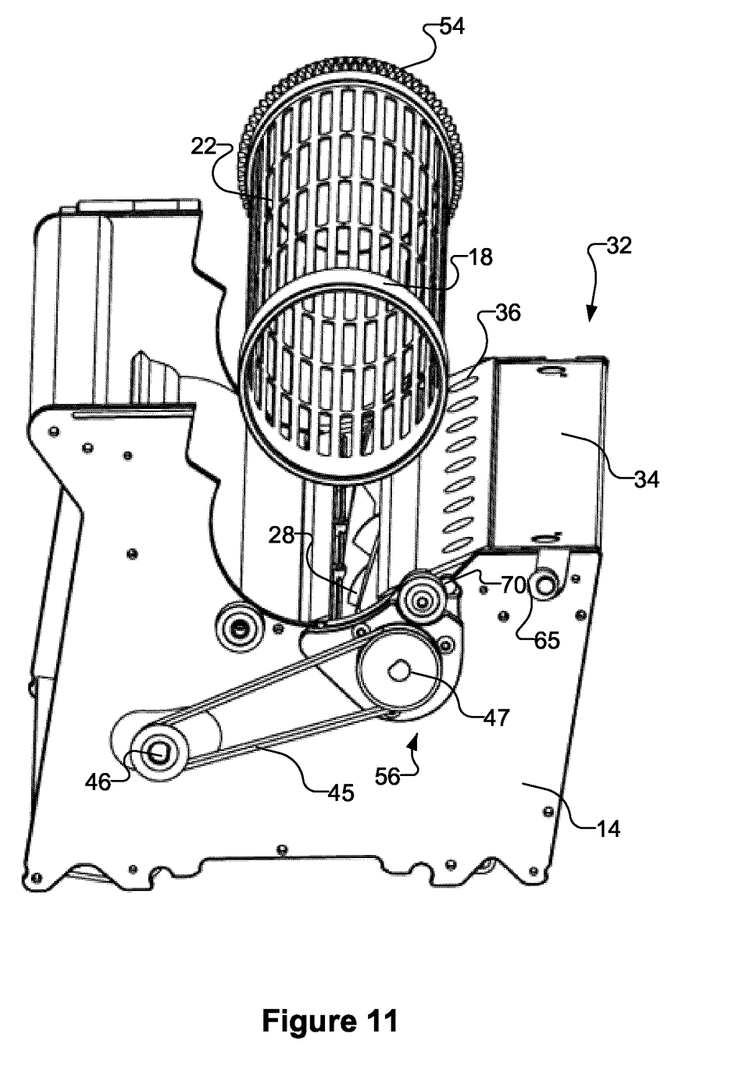
FIG. 11 is a perspective view of the embodiment of FIG. 1 showing the plant trimming machine with its tumbler disengaged from the end plates of the machine.

Another aspect of the invention is a method of disassembling a plant trimming machine. The method comprises the steps of: (a) removing or pivoting up the removable lid 24 (shown in FIG. 10), (b) removing the tumbler 18 (shown in FIG. 11), (c) pivoting the two cam-operating levers 67 upwards, (d) removing the bed bar assembly 32 from the end plate 14 (shown in FIG. 8), (e) pivoting the bearing blocks 56 upwards about the pivot points 60 (shown in FIG. 9), and (f) removing the bearing blocks 56, from the end plates 14. It will be apparent that this disassembly, including the operation of the cam-operating levers 67 and the removal of the cutting mechanism 16 and the bearing blocks 56, is all done manually, without the use of tools.

Throughout the foregoing description and the drawings, in which corresponding and like parts are identified by the same reference characters, specific details have been set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As will be apparent to those skilled in the art in the light of the forgoing disclosure, many alterations and modifications are possible in the practice of this invention without departing from the scope thereof. Accordingly, the scope of the invention is to be construed in accordance with the following claims.

The invention claimed is:

1. A plant-trimming apparatus, comprising:
    (a) two spaced-apart end plates;
    (b) a rotatable tumbler comprising a perforated cylindrical wall;
    (c) a rotatable reel comprising a reel shaft and a reel blade;
    (d) two bearing blocks, each detachably connected to a respective end plate, rotatably supporting a respective end of the reel;
    (e) a motor arranged to drive the reel and the tumbler;
    (f) a bed bar assembly comprising a bed bar and a bed knife, the bed knife being in operative engagement with the reel blade for cutting of plant material from the tumbler; and
    (g) a locking mechanism operable to secure the bearing blocks and the bed bar assembly to the end plates, wherein the locking mechanism comprises two cam lever mechanisms, each having a cam member disposed in a cam-receiving aperture of a respective end plate, a cam lever operable to rotate the respective cam member, and a pin member disposed between the respective end plate and bearing block.

2. A plant-trimming apparatus according to claim 1, wherein the cam lever is movable between a locking position in which the pin member is held between a shoulder of the end plate and the bearing block, and an unlocking position in which the pin member is released from the shoulder such that the bed bar assembly, the end plates and the rotatable reel are removable from the apparatus.

3. A plant-trimming apparatus according to claim 1, wherein the reel blade comprises a plurality of helical blades.

4. A plant-trimming apparatus, comprising:
    (a) two spaced-apart end plates;
    (b) a rotatable tumbler comprising a perforated cylindrical wall;
    (c) a rotatable reel comprising a reel shaft and a reel blade;
    (d) two bearing blocks, each detachably connected to a respective end plate, rotatably supporting a respective end of the reel, wherein the bearing blocks have an upper concave surface shaped to receive the tumbler;
    (e) a motor arranged to drive the reel and the tumbler;
    (f) a bed bar assembly comprising a bed bar and a bed knife, the bed knife being in operative engagement with the reel blade for cutting of plant material from the tumbler; and
    (g) a locking mechanism operable to secure the bearing blocks and the bed bar assembly to the end plates.

5. A plant-trimming apparatus according to claim 1, wherein the motor has a drive shaft in operative engagement with a reel gear.

6. A plant-trimming apparatus according to claim 5, wherein the reel gear and the motor are positioned adjacent to the same end plate.

7. A plant-trimming apparatus according to claim 6, wherein the operative engagement of the drive shaft and the reel gear transmits a rotary motion to a planet gear assembly that is positioned adjacent to the end plate opposite to the reel gear and the motor.

8. A plant-trimming apparatus according to claim 7, wherein the planet gear assembly comprises a sun gear, a plurality of planet gears rotatable around the sun gear, and a planet carrier attachable to the sun gear and the planet gears for engagement with a tumbler drive gear to rotate the tumbler.

9. A plant-trimming apparatus according to claim 8, wherein the sun gear and planet gears comprise outward-facing teeth, and the teeth of the planet gears engage with the teeth of the sun gear.

10. A plant-trimming apparatus according to claim 9, wherein a ratio of the number of teeth of the sun gear and the planet gears is such that approximately one to four helical blades of the reel intersect each hole of the tumbler during each rotation of the tumbler.

11. A plant-trimming apparatus according to claim 1, further comprising a removable lid.

12. A plant-trimming apparatus according to claim 11, wherein the lid is pivotably engageable with the tumbler.

13. A plant-trimming apparatus according to claim 1, further comprising tumbler support wheels positioned at each end of the tumbler to support the tumbler for rotation about its longitudinal axis.

14. A plant-trimming apparatus, comprising:
    (a) two spaced-apart end plates;
    (b) a rotatable tumbler;
    (c) a rotatable reel comprising a reel blade;
    (d) two bearing blocks, each detachably connected to a respective end plate, rotatably supporting a respective end of the reel;
    (e) means for rotating the reel and the tumbler;
    (f) a bed knife in operative engagement with the reel blade for cutting of plant material from the tumbler; and
    (g) a locking mechanism operable to secure the bearing blocks and the bed knife to the end plates, wherein the locking mechanism comprises two cam lever mechanisms, each having a cam member disposed in a cam-receiving aperture of a respective end plate, a cam lever operable to rotate the respective cam member, and a pin member disposed between the respective end plate and bearing block.

15. A plant-trimming apparatus according to claim 14, wherein the bed knife is removably attached to a bed bar to form a bed bar assembly.

16. A plant-trimming apparatus according to claim 15, wherein the locking mechanism is operable to secure the bed bar assembly to the end plates.

17. A plant-trimming apparatus, comprising:
(a) two spaced-apart support members;
(b) a rotatable, perforated tumbler;
(c) a rotatable cutting member;
(d) two bearing blocks, each detachably connected to a respective support member, rotatably supporting a respective end of the rotatable cutting member;
(e) means for rotating the rotatable cutting member and the tumbler;
(f) a non-rotatable cutting member in operative engagement with the rotatable cutting member for cutting of plant material from the tumbler; and
(g) means for detachably affixing the bearing blocks and the non-rotatable cutting member to the support members, comprising two cam lever mechanisms, each having a cam member disposed in a cam-receiving aperture of a respective support member, a cam lever operable to rotate the respective cam member, and a pin member disposed between the respective support member and bearing block.

18. A method of disassembling a plant-trimming apparatus having: two spaced-apart end plates; a rotatable tumbler comprising a perforated cylindrical wall; a rotatable reel comprising a reel shaft and a reel blade; two bearing blocks, each detachably connected to a respective end plate, rotatably supporting a respective end of the reel; a bed bar assembly comprising a bed bar and a bed knife, the bed knife being in operative engagement with the reel blade for cutting of plant material from the tumbler; a locking mechanism operable to secure the bearing blocks and the bed bar assembly to the end plates, the locking mechanism comprising two cam lever mechanisms, each having a cam member disposed in a cam-receiving aperture of a respective end plate, a cam lever operable to rotate the respective cam member, and a bed bar pin member disposed between the respective end plate and bearing block; the method comprising the steps of:
(a) removing the rotatable tumbler;
(b) pivoting the cam levers to an unlocking position;
(c) removing the bed bar assembly; and
(d) removing the two bearing blocks from the end plates, wherein the two bearing blocks and the reel are removed from the apparatus as a single unit.

19. A method of disassembling the plant-trimming apparatus according to claim 18, further comprising a first step of removing a removable lid.

* * * * *